United States Patent
Guo et al.

(10) Patent No.: US 12,413,418 B2
(45) Date of Patent: Sep. 9, 2025

(54) METHOD AND SYSTEM FOR SECURE AGGREGATION PROTOCOL FOR PROTECTING PRIVACY OF INDIVIDUAL DATA SETS

(71) Applicant: JPMorgan Chase Bank, N.A., New York, NY (US)

(72) Inventors: Yue Guo, Jersey City, NJ (US); Antigoni Ourania Polychroniadou, New York, NY (US); Tucker Richard Balch, Suwanee, GA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 120 days.

(21) Appl. No.: 18/530,553

(22) Filed: Dec. 6, 2023

(65) Prior Publication Data
US 2025/0175346 A1    May 29, 2025

(30) Foreign Application Priority Data
Nov. 28, 2023   (GR) ............................... 20230100984

(51) Int. Cl.
*H04L 9/32* (2006.01)
*H04L 9/08* (2006.01)

(52) U.S. Cl.
CPC .......... *H04L 9/3247* (2013.01); *H04L 9/0825* (2013.01); *H04L 9/3236* (2013.01)

(58) Field of Classification Search
CPC .... H04L 9/3247; H04L 9/0825; H04L 9/3236
See application file for complete search history.

(56) References Cited

U.S. PATENT DOCUMENTS

| | | | |
|---|---|---|---|
| 8,612,769 B2 * | 12/2013 | Guenther | H04L 9/3247 |
| | | | 713/168 |
| 2012/0316956 A1 * | 12/2012 | Nath | G06Q 30/02 |
| | | | 705/14.46 |

(Continued)

FOREIGN PATENT DOCUMENTS

| | | | | |
|---|---|---|---|---|
| CN | 112597542 A | * | 4/2021 | G06F 21/602 |
| CN | 117332451 A | * | 1/2024 | |

(Continued)

OTHER PUBLICATIONS

Shweta Srinivasan, "Private And Robust Aggregate Statistics Collection With Shamir-Secret Sharing", Submitted as partial fulfillment of the requirements for the degree of Master of Science in Computer Science in the Graduate College of the, 8 pages (Year: 2022).*

*Primary Examiner* — Shahriar Zarrineh
(74) *Attorney, Agent, or Firm* — GREENBLUM & BERNSTEIN, P.L.C.

(57) ABSTRACT

A method for providing a secure aggregation protocol that facilitates federated learning of machine learning models while protecting privacy of individual data sets associated with participants is provided. The method includes: a setup phase by which public key—secret key pairs are used to verify signatures and facilitate secure transmissions of encrypted messages that include datasets to be aggregated; and an aggregation phase by which a random oracle/hash function is used to facilitate the aggregation of newly submitted datasets into the preexisting aggregated dataset.

20 Claims, 11 Drawing Sheets

(56) References Cited

U.S. PATENT DOCUMENTS

| | | | |
|---|---|---|---|
| 2012/0324229 A1* | 12/2012 | Buldas | H04L 9/3247 |
| | | | 713/176 |
| 2017/0250816 A1* | 8/2017 | Popa | G06F 21/62 |
| 2018/0101697 A1* | 4/2018 | Rane | H04L 9/085 |
| 2019/0296914 A1* | 9/2019 | Martin | G09C 1/00 |
| 2020/0082126 A1* | 3/2020 | Brown | G06Q 20/401 |
| 2020/0313856 A1* | 10/2020 | Basu | H04L 9/3073 |
| 2021/0067345 A1* | 3/2021 | Shamai | H04L 9/085 |
| 2021/0336792 A1* | 10/2021 | Agrawal | H04L 9/085 |
| 2024/0378456 A1* | 11/2024 | Bangalore Lakshman | |
| | | | G06N 3/08 |
| 2025/0061209 A1* | 2/2025 | Wang | H04L 9/008 |

FOREIGN PATENT DOCUMENTS

| | | | |
|---|---|---|---|
| CN | 119011628 A | * | 11/2024 |
| JP | 2013512625 A | * | 4/2013 |

* cited by examiner

600

---
Algorithm 1 Setup (with RO)

This protocol uses the following algorithms defined in Section 1: a Public key infrastructure, a Diffie-Hellman key exchange scheme (KA.setup, KA.gen, KA.agree); a CCA2-secure authenticated encryption scheme (AE.enc, AE.dec); a Shamir's secret sharing scheme (SS.share, SS.recon, SS.exponentShare, SS.exponentRecon). It proceeds as follows:

Input: A central server $S$ and a user set $\mathcal{U}$ of $n$ users. Each user can communicate with the server through a private authenticated channel. All parties are given the public parameters: the security parameter $\kappa$, the number of users $n$, a threshold value $t$, honestly generated $pp \leftarrow$ KA.setup($\kappa$) for key agreement, the input space, and a field $\mathbb{Z}_q$ for secret sharing.

Moreover, every party $i$ holds its own signing key $d_i^{SK}$ and a list of verification keys $d_j^{PK}$ for all other parties $j$. The server $S$ also has all users' verification keys.

Output: Every user $i \in \mathcal{U}$ either obtains a set of users $\mathcal{U}_i$ such that $|\mathcal{U}_i| \geq t$ and a share $r_{j,i}$ of a secret value $r_j$ for each $j \in \mathcal{U}_i$ or aborts. The server either outputs a set of users $\mathcal{U}_S$ such that $|\mathcal{U}_S| \geq t$ or aborts.

Round 1: Encryption Key Exchange

1: Each user $i \in \mathcal{U}$: generates a pair of encryption keys $(sk_i, pk_i) \leftarrow$ KA.gen($pp$), then signs the public encryption key $pk_i$ with $d_i^{SK}$ and sends $(pk_i, \sigma_i)$ to the server, in which $\sigma_i$ denotes the signature by user $i$.

2: Server $S$: On receiving $(pk_j, \sigma_j)$ from user $j$, the server verifies the signature $\sigma_j$ with $d_j^{PK}$. If the signature verification fails, ignore the message from user $j$. Otherwise, add $j$ to a user list $\mathcal{U}_S^1$. If $|\mathcal{U}_S^1| < t$ after processing all messages from users, $S$ aborts. Otherwise, the server sends all public keys and signatures it receives from users $j \in \mathcal{U}_S^1$ to each user in $\mathcal{U}_S^1$.

Round 2: Mask Sharing

3: Each user $i$: On receiving $(pk_j, \sigma_j)$ for a user $j \in \mathcal{U}$ from the server, each user $i$ verifies the signatures $\sigma_j$ with $d_j^{PK}$. It aborts if any signature verification fails as that indicates the server is corrupt. Otherwise, it puts $j$ into a user list $\mathcal{U}_i^1$ and stores $ek_{i,j} =$ KA.agree($pk_j, sk_i$). It aborts if $|\mathcal{U}_i^1| < t$ after processing all received messages. Otherwise, user $i$ uniformly randomly chooses $r_i$, and calculates the secret shares of $r_i$ by $\{r_{i,j}\}_{j \in \mathcal{U}} \leftarrow$ SS.share($r_i, \mathcal{U}_i^1, t$). Then it encrypts each share $r_{i,j}$ by $c_{i,j} \leftarrow$ AE.enc($r_{i,j}, ek_{i,j}$) and sends all encrypted shares $\{c_{i,j}\}_{j \in \mathcal{U}}$ to the server.

4: Server $S$: If it receives messages from less than $t$ users, abort. Otherwise, it denotes this set of users with $\mathcal{U}_S$. It sends each $c_{i,j}$ to the corresponding receiver $j$ for each $i \in \mathcal{U}_S$. Then it outputs the client set $\mathcal{U}_S$.

Round 3: User Receiving Shares

5: Each user $i$: If it receives $c_{j,i}$ for less than $t$ users $j$ from the server, abort. Otherwise, decrypt each encrypted share by $r_{j,i} =$ AE.dec($c_{j,i}, ek_{i,j}$). If the decryption of the share from user $j$ fails, it ignores the encrypted share. Otherwise, it puts $j$ into a user set $\mathcal{U}_i^2$ and stores $r_{j,i}$. If $|\mathcal{U}_i^2| < t$ after processing all shares, it aborts. Otherwise, it stores $r_i$, the set $\mathcal{U}_i = \mathcal{U}_i^2$, and all $r_{j,i}$ for $j \in \mathcal{U}_i$.

Algorithm 5 Aggregation (MicroFedML$_3$)

This protocol uses the following algorithms defined in Section 3: a Public key infrastructure, a Shamir's secret sharing scheme (SS.share, SS.recon, SS.expoShare, SS.expoRecon), a hash function $H(\cdot)$. It proceeds as follows:

Input: Every user $i$ holds its own signing key $d_i^{SK}$ and all users' verification key $d_j^{PK}$ for $j \in [n]$, $r_i$, a list of users $\mathcal{U}_i$, and $r_{j,i}$ for every $j \in \mathcal{U}_i$ it obtains in the Setup phase. Moreover, it also holds a secret input $x_i^k$ for every iteration $k$. All users also hold a tuple $(B, N, p, s, f, G, F)$ which is honestly generated by a pair of algorithms (cl.gen, cl.solve) as described in Definition A.1.

The server $S$ holds a tuple $(B, p, s, f, G, F)$ and has access to algorithm cl.solve($\cdot$). It also holds all users' verification keys, all public parameters it receives in the Setup phase, and a list of users $\mathcal{U}_S$ which is its output of the Setup phase.

Moreover, in every iteration $k$, both all users and the server has access to a fresh random generator $g_k$ of group $G$.

Output: For each iteration $k$, if there are at least $t$ users being always online during iteration $k$, then at the end of iteration $k$, the server $S$ outputs $\sum_{i \in \mathcal{O}^k} x_i^k$, in which $\mathcal{O}^k$ denotes a set of users of size at least $t$.

Note: For simplicity of exposition, we omit the superscript $k$ of all variables when it can be easily inferred from the context.

1: for Iteration $k = 1, 2, \ldots$ do
   Round 1: Secret Sharing:
2:    User $i$: It calculates and sends $g_k^{r_i} f^{x_i}$ to the server.
3:    Server $S$: Denote the set of users it receives messages from with $\mathcal{O}$. If $|\mathcal{O}| < t$, abort. Otherwise, it sends $\mathcal{O}$ to all users $i \in \mathcal{O}$.
   Round 2: Online Set Checking (Only needed in Malicious setting):
4:    User $i$: On receiving $\mathcal{O}$ from the server, it first checks that $\mathcal{O} \subseteq \mathcal{U}_i$ and $|\mathcal{O}| \geq t$, then signs the set $\mathcal{O}$ and sends the signature $\sigma_i$ to the server.
5:    Server $S$: If it receives less than $t$ valid signatures on $\mathcal{O}$, abort. Otherwise, it forwards all valid signatures to all users in $\mathcal{O}$.
   Round 3: Mask Reconstruction on the Exponent:
6:    User $i$: On receiving signatures from the server, it first verifies the signatures with $\mathcal{O}$ and the verification keys of the other users. If there are less than $t$ valid signatures, abort. Otherwise, it calculates $\zeta_i = g_k^{\sum_{j \in \mathcal{O}} r_{j,i}}$. It sends $\zeta_i$ to the server.
7:    Server $S$: If it receives $\zeta_i$ from less than $t$ users, abort. Otherwise, let $\mathcal{O}'$ denote the set of users $i$ successfully sends $\zeta_i$ to the server. The server reconstructs $R_\mathcal{O} = \text{SS.expoRecon}(\{\zeta_j, j\}_{j \in \mathcal{O}'}, t)$ and calculates $$\sum_{i \in \mathcal{O}} x_i \leftarrow \text{cl.solve}(B, p, g, f, G, F, g_k^{\sum_{i \in \mathcal{O}} r_i} f^{\sum_{i \in \mathcal{O}} x_i} / R_\mathcal{O})$$

to obtain $\sum_{i \in \mathcal{O}} x_i$.
8: end for

Algorithm 3 Setup (with RO and Group)

This protocol uses the following algorithms defined in Section 1: a Public key infrastructure, a Diffie-Hellman key exchange scheme (KA.setup, KA.gen, KA.agree); a CCA2-secure authenticated encryption scheme (AE.enc, AE.dec); a Shamir's secret sharing scheme (SS.share, SS.recon, SS.exponentShare, SS.exponentRecon). It also accesses a random oracle $H(\cdot)$, which has range in $\mathbb{Z}_p^*$. It proceeds as follows:

Input: A central server $S$ and a user set $U$ of $n$ users. Each user can communicate with the server through a private authenticated channel. All parties are given public parameters: the security parameter $\kappa$, the number of users $n$, a threshold value $t$, honestly generated $pp \leftarrow$ KA.setup($\kappa$) for key agreement, the input space $\mathcal{X}$, a field $\mathbb{F}$ for secret sharing.

Moreover, all clients are uniformly randomly divided into $B$ groups $G_1, \ldots, G_B$, each of which contains $n/B$ clients. For convenience, in the description of the protocol, let $G_{-1} = G_B$, and $G_{B+1} = G_1$.

The user $i$ in group $d$ holds the group index $d$, its own signing key $d_i^{SK}$ and a list of verification keys $d_j^{PK}$ for $j \in [n]$. The server $S$ also has all users' verification keys.

Output: Every user $i \in U$ who is online through the Setup phase either obtains a set of users $U_i$ of size at least $t$ and two shares $r_{j,i}, h_{j,i}$ for each $j \in U_i$ or abort. The server either obtains a set of users $U_S^3$ such that $|U_S^3| \geq Bt$ and a global mask $h_S$ or abort.

Round 1: Key Exchange:
1: Each user $i \in G_d$: It generates a pair of encryption keys $(pk_i, sk_i)$ and two pairs of masking keys $(pk_i^1, sk_i^1)$ and $(pk_i^{-1}, sk_i^{-1})$. It sends the three public keys with signatures on them to the server.
2: Server $S$: Let $U_S^1$ denotes the set of users send the server public keys with valid signatures. For $i \in U_S^1 \cap G_d$, the server distributes the public encryption key $pk_i$ and the signature received from user $i \in G_d$ to all users in $U_S^1 \cap (G_d \cup G_{d-1} \cup G_{d+1})$, and distributes the public masking key $sk_i^b$ with the signature to all users in $U_S^1 \cap G_{d+b}$ for $b \in \{-1, 1\}$.

Round 2: Secret Mask Key Sharing:
3: Each user $i \in G_d$: Let $U_i^1$ denote the set of users from whom user $i$ receives the public keys with valid signatures. Note that now $U_i^1 \subseteq G_d \cup G_{d-1} \cup G_{d+1}$. It runs the key exchange algorithm as described in line 3 in Algorithm 1 to generate $ek_{i,j}$, $mk_{i,j}^1$, and $mk_{i,j}^{-1}$ for $j \in U_i^1$.

It then calculates $t$-out-of-$\frac{n}{B}$ secret shares of $sk_i^b$ among $G_{d+b}$ to generate $\{sk_{i,j}^b\}_{j \in G_{d+b}}$ and encrypts each share with $ek_{i,j}$ to generate cipher text $c_{i,j}^{sk^b}$ for $b = \{-1, 1\}$. It then sends all encrypted shares to the server.

4. Server $S$: If it receives messages with valid signatures from less than $t$ users in group $G_d$ for any $d \in [B]$, abort. Otherwise, let $\mathcal{U}_S^2$ denote the set of users who successfully send the server messages with valid signatures. For each group $d \in [B]$ and each $i \in \mathcal{U}_S^2 \cap G_d$, The server sends the public mutual mask key with the signature $(pk_j^b, \sigma_j^b)$ to all $j \in \mathcal{U}_S^2 \cap G_{d+b}$ for $b \in \{-1, 1\}$, and sends each encrypted share $c_{i,j}^{sk^b}$ to the corresponding receiver.

Round 3: Mask Sharing:

5. Each user $i \in G_d$: On receiving $(pk_j^b, \sigma_j^b, c_{j,i}^{sk^b})$ for user $j$ in group $G_{d-b}$ for $b \in \{-1, 1\}$ from the server, it verifies the signature and abort if the signature verification fails. Otherwise, it runs the key agreement algorithm to get $mk_{i,j}$ with $pk_j^b$ and $sk_i^{-b}$ and puts $j$ into a user list $\mathcal{U}_i^2$. It also decrypts the encrypted share by $sk_{j,i}^b = AE.dec(c_{j,i}^{sk^b}, ek_{i,j})$. If any $c_{j,i}^{sk^b}$ for $j \in \mathcal{U}_i^2 \cap G_d$ is missing or cannot be correctly decrypted, remove $j$ from $\mathcal{U}_i^2$. It then checks if for $b \in \{1, -1\}$, $|\mathcal{U}_i^2 \cap G_{d+b}| < t$. If yes, abort.

Otherwise, user $i$ uniformly randomly chooses a self mask (r-mask) and calculates the h-mask $h_i = \sum_{j \in \mathcal{U}_i^2 \cap G_{d-1}} mk_{i,j} - \sum_{j \in \mathcal{U}_i^2 \cap G_{d+1}} mk_{i,j}$. Then it calculates the shares of $r_i$ and $h_i$ among $j \in \mathcal{U}_i^2 \cap G_d$ and encrypts the shares with $ek_{i,j}$ as described in line 3 of Algorithm 1. It then sends the encrypted shares $\{c_{i,j}^r, c_{i,j}^h\}_{j \in \mathcal{U}_i^2 \cap G_d}$ to the server.

6. Server $S$: If for any group it receives messages from less than $t$ users in the group, abort. Otherwise, denote the set of all users $i$ who successfully sends the server encrypted shares with $\mathcal{U}_S^3$. It sends the shares to the corresponding receiver $j$ for each $i \in \mathcal{U}_S^3$.

Round 4: Agreeing on the Offline User Set:

7. Each user $i \in G_d$: It decrypts each received encrypted share by $r_{j,i} = AE.dec(c_{j,i}^r, ek_{i,j})$, and $h_{j,i} = AE.dec(c_{j,i}^h, ek_{i,j})$. If the decryption of the share from user $j$ fails, it ignores the message from user $j$. Otherwise, it puts $j$ into a user set $\mathcal{U}_i^3$ and stores $r_{j,i}$ and $h_{j,i}$. If $|\mathcal{U}_i^3| < t$ after processing all shares, it aborts. Otherwise, it signs and sends a user list offline$_i = (\mathcal{U}_i^2 \cap G_d) \backslash \mathcal{U}_i^3$ with the signature $\sigma_i$ on the list to the server.

8. Server $S$: If the server receives offline$_i$ with valid signatures $\sigma_i$ from less than $t$ users $i$ from any group $G_d$, abort. Otherwise, denote the set of users $i$ who send the offline lists with valid signatures to the server with $\mathcal{U}_S^4$. The server sends the list and the signature (offline$_i, \sigma_i$) for all $i \in G_d \cap \mathcal{U}_S^4$ to all users in $(G_{d-1} \cup G_{d+1}) \cap \mathcal{U}_S^4$.

Round 5: Reconstructing Offline Users' Masks:

9. Each user $i \in G_d$: After receiving all user lists with the signature (offline$_j, \sigma_j$) from the server, it verifies the signatures and aborts if any signature verification fails. It also aborts if it receives less than $t$ offline lists with valid signatures from group $G_{d-1}$ or $G_{d+1}$. Otherwise, for group $G_{d-1}$, it checks if there is any user $j' \in G_{d-1} \cap \mathcal{U}_i^2$ being included in at least $t$ offline lists it receives from users in $G_{d-1}$. If yes, it sends $sk_{j',i}^1$ to the server. It repeats the process on $G_{d+1}$. It also outputs $\mathcal{U}_i = \mathcal{U}_i^3$ and $r_{j,i}, h_{j,i}$ for $j \in \mathcal{U}_i$.

10. Server $S$: For each group $d$, if for a user $i \in G_d$ the server receives at least $t$ shares $sk_{i,j}^b$ from both groups $G_{d+b}$ for $b \in \{-1, 1\}$, the server puts $i$ into a user list offline$_S$. Each user in this list fails to share their r- and h-masks with their group members in Round 3, while the symmetric masking keys $mk_{i,j}$ between itself and the member $j$ of $i$'s neighbor group have been included in the $h_i$. Thus, the server needs to calculates $h_i$ by reconstructing $sk_i^b$, running the key exchange algorithm for $i$ and user $j \in \mathcal{U}_S^2 \cap G_{d-1}$ by $mk_{i,j} = KA.agree(pk_j^1, sk_i^{-1})$, for $i$ and user $j \in \mathcal{U}_S^2 \cap G_{d+1}$ by $mk_{i,j} = KA.agree(pk_j^{-1}, sk_i^1)$, and calculating $h_i = \sum_{j \in \mathcal{U}_S^2 \cap G_{d-1}} mk_{i,j} - \sum_{j \in \mathcal{U}_S^2 \cap G_{d+1}} mk_{i,j}$. Then it obtains $\mathcal{U}_S = \mathcal{U}_S^3 \backslash \text{offline}_S$ and $h_S = \sum_{i \in \text{offline}_S} h_i$.

Algorithm 4 Aggregation (MicroFedML$_3$)

This protocol uses the following algorithms defined in Section 3: a public key infrastructure, a Shamir's secret sharing scheme (SS.share, SS.recon, SS.expoShare, SS.expoRecon). It proceeds as follows:

Input: Every user $i$ holds its own signing key $d_i^{SK}$ and all users' verification key $d_j^{PK}$ for $j \in [n]$, $r_i, h_i$, a list of users $\mathcal{U}_i \subseteq G_d$ with $r_{j,i}, h_{j,i}$ for every $j \in \mathcal{U}_i$. Moreover, it also holds a secret input $x_i^k$ for every iteration $k$. All users also hold a tuple $(B, N, p, s, f, G, F)$ which is honestly generated by a pair of algorithms (cl.gen, cl.solve) as described in Definition 3.1.

The server $S$ holds a tuple $(B, p, s, f, G, F)$ and has access to algorithm cl.solve($\cdot$). It also holds all users' verification keys, all public parameters and inputs it receives in the Setup phase, and the list of users $\mathcal{U}_S$ it outputs in the Setup phase.

Moreover, in every iteration $k$, both all users and the server has access to a fresh random generator $g_k$ of group $G$.

Output: For each iteration $k$, if there are at least $t$ users being always online during iteration $k$, then at the end of iteration $k$, the server $S$ outputs $\sum_{i \in O^k} x_i^k$, in which $O^k$ denotes a set of users of size at least $t$.

Note: For simplicity of exposition, we omit the superscript $k$ of all variables when it can be easily inferred from the context.

1: for iteration $k = 1, 2, \ldots$ do

Round 1: Secret Sharing:

2:     User $i$: It calculates and sends $X_i = g_k^{r_i + h_i} f^{x_i}$ to the server.

3:     Server $S$:
   If it receives messages from less than $t$ users from any group, abort. If it receives messages from a user not in $\mathcal{U}_S$, ignore the message. Otherwise, let $O$ denote the set of users $i$ who successfully send the masked input to the server. For each group $G_d$, the server sends $O_d = O \cap G_d$ to all users $i \in O_d$.

Round 2: Online Set Checking (Only needed in Malicious setting):

4:     User $i$: On receiving $O_d$ from the server, it checks that $|O_d| \geq t$ and signs it with its signing key. Then it sends the signature $\sigma_i$ to the server.

5:     Server $S$: On receiving the signatures from user $i \in G_d$, it verifies the signature on $O_d$ and user $i$'s verification key. If the signature is invalid, ignore it. If it receives less than $t$ valid signatures from any group, abort. Otherwise, it forwards all valid signatures on $O_d$ to user $i \in O_d$ for each group $G_d$.

Round 3: Mask Reconstruction on the Exponent:

6:     User $i$: On receiving signatures from the server, it first verifies the signatures of the other users. If there are less than $t$ valid signatures, abort. Otherwise, it calculates $\zeta_i = g_k^{\sum_{j \in O_d} r_{j,i} - \sum_{j \in \mathcal{U}_i \setminus O_d} h_{j,i}}$. It sends $\zeta_i$ to the server.

7:     Server $S$: If it receives $\zeta_i$ from less than $t$ users in any group $G_d$, abort. Otherwise, the server calculates $$R_{O_d} = \text{SS.expoRecon}(\{\zeta_i, j\}_{j \in O_d'}, t)$$

in which $O_d'$ denotes the users from $G_d$ who send $\zeta$ to the server in the previous round. It then calculates $$\sum_{i \in O} x_i \leftarrow \text{cl.solve}\left(B, p, g, f, G, F, \prod_{i \in O} X_i / \prod_d R_{O_d}\right)$$

to obtain $\sum_{i \in O} x_i$.

8: end for

FIG. 10

METHOD AND SYSTEM FOR SECURE AGGREGATION PROTOCOL FOR PROTECTING PRIVACY OF INDIVIDUAL DATA SETS

CROSS-REFERENCE TO RELATED APPLICATIONS

This application claims priority benefit from Greek application No. 20230100984, filed Nov. 28, 2023, which is hereby incorporated by reference in its entirety.

BACKGROUND

1. Field of the Disclosure

This technology generally relates to facilitating federated learning of machine learning models while protecting privacy of participants, and more particularly to a method and a system for providing a secure aggregation protocol that facilitates federated learning of machine learning models while protecting privacy of individual data sets associated with participants.

2. Background Information

Federated learning enables a group of clients to collaboratively learn a machine learning model with the help of a central server without sharing their private data. Conventionally, one way to preserve privacy of each individual participant/client within the group of clients is to aggregate the data of all participants/clients and then providing the aggregated data to the central server, such that it is not possible for the central server to determine which portions of the aggregated data are associated with which individual participants/clients.

However, a problem arises when updated information is provided by an individual participant, i.e., a message associated with a local model update that is received from a particular participant/client, because the central server can extract sensitive information about the individual dataset associated with that particular client, unless further measures are taken to preserve the privacy of each individual client/participant.

Accordingly, there is a need for a mechanism for providing a secure aggregation protocol that facilitates federated learning of machine learning models while protecting privacy of individual data sets associated with participants.

SUMMARY

The present disclosure, through one or more of its various aspects, embodiments, and/or specific features or sub-components, provides, inter alia, various systems, servers, devices, methods, media, programs, and platforms for providing a secure aggregation protocol that facilitates federated learning of machine learning models while protecting privacy of individual data sets associated with participants.

According to an aspect of the present disclosure, a method for aggregating data is provided. The method is implemented by at least one processor. The method includes: receiving, by the at least one processor from a first user from among a plurality of users, a first public key and a first signature that is generated by the first user by using a first secret key that is associated with the first user; verifying, by the at least one processor, the first signature; transmitting, by the at least one processor to the first user, a set of public keys that are associated with other users included in the plurality of users; receiving, by the at least one processor from the first user, a first set of encrypted messages; verifying, by the at least one processor, that at least a predetermined minimum number of encrypted messages have been received from the plurality of users; transmitting, by the at least one processor to the first user, at least one set of encrypted messages received from the other users included in the plurality of users; receiving, by the at least one processor from the first user, a result of applying a predetermined hash function to a first iteration number and using a result thereof as a base of exponentiation for which a corresponding exponent is a combination of a first new dataset with a first random mask selected by the first user; transmitting, by the at least one processor to the first user, a first current list of online users; receiving, by the at least one processor from the first user, a second signature that is generated by using the first secret key with respect to the first current list of online users; transmitting, by the at least one processor to the first user, a first set of signatures that are received from the other users included in the plurality of users; receiving, by the at least one processor from the first user, a result of applying the predetermined hash function to the first iteration number; and aggregating, by the at least one processor, the first new dataset with the first aggregated dataset in order to generate a second aggregated dataset.

The method may further include: when a result of applying the predetermined hash function to a combination of the second aggregated dataset with a second new dataset is received from a second user from among the plurality of users, transmitting, to the second user, a second current list of online users; receiving, from the second user, a third signature that is generated by the second user using a second secret key that is associated with the second user with respect to the second current list of online users; transmitting, to the second user, a second set of signatures that are received from the other users included in the plurality of users; receiving, from the second user, a result of applying the predetermined hash function to the first iteration number and using a result thereof as a base of exponentiation for which a corresponding exponent is a sum of shares of random masks received from the other users; and aggregating the second new dataset with the second aggregated dataset in order to generate a third aggregated dataset.

The predetermined minimum number of encrypted messages may be equal to at least one more than two-thirds of a total number of users included in the plurality of users.

The method may further include guaranteeing that a content of the first new dataset is not knowable to the other users when a maximum number of malicious adversaries included in the plurality of users is less than one-third of a total number of users included in the plurality of users.

The method may further include using a predetermined public key infrastructure to bind each respective one of the set of public keys with a corresponding one of the plurality of users.

The method may further include using a Diffie-Hellman key exchange algorithm to facilitate a secure agreement with respect to a symmetric secret to be shared between a pair of users from among the plurality of users.

The method may further include using a predetermined symmetric authentication scheme to guarantee that messages between a pair of users from among the plurality of users cannot be extracted by a malicious adversary and cannot be tampered with in an undetectable manner.

The method may further include using a Shamir's secret sharing scheme to divide a secret into a predetermined number of shares such that a reconstruction of the secret requires knowledge of a predetermined minimum number of the shares.

The predetermined hash function may include a random oracle that is designed to answer each respective unique query with a uniformly random response in a predetermined output domain.

According to another aspect of the present disclosure, a computing apparatus for aggregating data is provided. The computing apparatus includes a processor; a memory; and a communication interface coupled to each of the processor and the memory. The processor is configured to: receive, via the communication interface from a first user from among a plurality of users, a first public key and a first signature that is generated by the first user by using a first secret key that is associated with the first user; verify the first signature; transmit, via the communication interface to the first user, a set of public keys that are associated with other users included in the plurality of users; receive, via the communication interface from the first user, a first set of encrypted messages; verify that at least a predetermined minimum number of encrypted messages have been received from the plurality of users; transmit, via the communication interface to the first user, at least one set of encrypted messages received from the other users included in the plurality of users; receive, via the communication interface from the first user, a result of applying a predetermined hash function to a first iteration number and using a result thereof as a base of exponentiation for which a corresponding exponent is a combination of a first new dataset with a first random mask selected by the first user; transmit, via the communication interface to the first user, a first current list of online users; receive, via the communication interface from the first user, a second signature that is generated by using the first secret key with respect to the first current list of online users; transmit, via the communication interface to the first user, a first set of signatures that are received from the other users included in the plurality of users; receive, via the communication interface from the first user, a result of applying the predetermined hash function to the first iteration number; and aggregate the first new dataset with the first aggregated dataset in order to generate a second aggregated dataset.

The processor may be further configured to: when a result of applying the predetermined hash function to a combination of the second aggregated dataset with a second new dataset is received from a second user from among the plurality of users, transmit, to the second user, a second current list of online users; receive, from the second user, a third signature that is generated by the second user using a second secret key that is associated with the second user with respect to the second current list of online users; transmit, to the second user, a second set of signatures that are received from the other users included in the plurality of users; receive, from the second user, a result of applying the predetermined hash function to the first iteration number and using a result thereof as a base of exponentiation for which a corresponding exponent is a sum of shares of random masks received from the other users; and aggregate the second new dataset with the second aggregated dataset in order to generate a third aggregated dataset.

The predetermined minimum number of encrypted messages may be equal to at least one more than two-thirds of a total number of users included in the plurality of users.

The processor may be further configured to guarantee that a content of the first new dataset is not knowable to the other users when a maximum number of malicious adversaries included in the plurality of users is less than one-third of a total number of users included in the plurality of users.

The processor may be further configured to use a predetermined public key infrastructure to bind each respective one of the set of public keys with a corresponding one of the plurality of users.

The processor may be further configured to use a Diffie-Hellman key exchange algorithm to facilitate a secure agreement with respect to a symmetric secret to be shared between a pair of users from among the plurality of users.

The processor may be further configured to use a predetermined symmetric authentication scheme to guarantee that messages between a pair of users from among the plurality of users cannot be extracted by a malicious adversary and cannot be tampered with in an undetectable manner.

The processor may be further configured to use a Shamir's secret sharing scheme to divide a secret into a predetermined number of shares such that a reconstruction of the secret requires knowledge of a predetermined minimum number of the shares.

The predetermined hash function may include a random oracle that is designed to answer each respective unique query with a uniformly random response in a predetermined output domain.

According to yet another aspect of the present disclosure, a non-transitory computer readable storage medium storing instructions for aggregating data is provided. The storage medium includes executable code which, when executed by a processor, causes the processor to: receive, from a first user from among a plurality of users, a first public key and a first signature that is generated by the first user by using a first secret key that is associated with the first user; verify the first signature; transmit, to the first user, a set of public keys that are associated with other users included in the plurality of users; receive, from the first user, a first set of encrypted messages; verify that at least a predetermined minimum number of encrypted messages have been received from the plurality of users; transmit, to the first user, at least one set of encrypted messages received from the other users included in the plurality of users; receive, from the first user, a result of applying a predetermined hash function to a first iteration number and using a result thereof as a base of exponentiation for which a corresponding exponent is a combination of a first new dataset with a first random mask selected by the first user; transmit, to the first user, a first current list of online users; receive, from the first user, a second signature that is generated by using the first secret key with respect to the first current list of online users; transmit, to the first user, a first set of signatures that are received from the other users included in the plurality of users; receive, from the first user, a result of applying the predetermined hash function to the first iteration number; and aggregate the first new dataset with the first aggregated dataset in order to generate a second aggregated dataset.

When executed by the processor, the executable code may further cause the processor to: when a result of applying the predetermined hash function to a combination of the second aggregated dataset with a second new dataset is received from a second user from among the plurality of users, transmit, to the second user, a second current list of online users; receive, from the second user, a third signature that is generated by the second user using a second secret key that is associated with the second user with respect to the second current list of online users; transmit, to the second user, a second set of signatures that are received from the other users included in the plurality of users; receive, from the second user, a result of applying the predetermined hash function to the first iteration number and using a result thereof as a base of exponentiation for which a corresponding exponent is a sum of shares of random masks received from the other users; and aggregate the second new dataset with the second aggregated dataset in order to generate a third aggregated dataset.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 6 is an algorithm that corresponds to the setup phase of the secure aggregation protocol that facilitates federated learning of machine learning models while protecting privacy of individual data sets associated with participants, according to an exemplary embodiment.

FIGS. 8, 9A, 9B, and 10 are algorithms that correspond to the setup phase and/or the aggregation phase of the secure aggregation protocol that facilitates federated learning of machine learning models while protecting privacy of individual data sets associated with participants, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
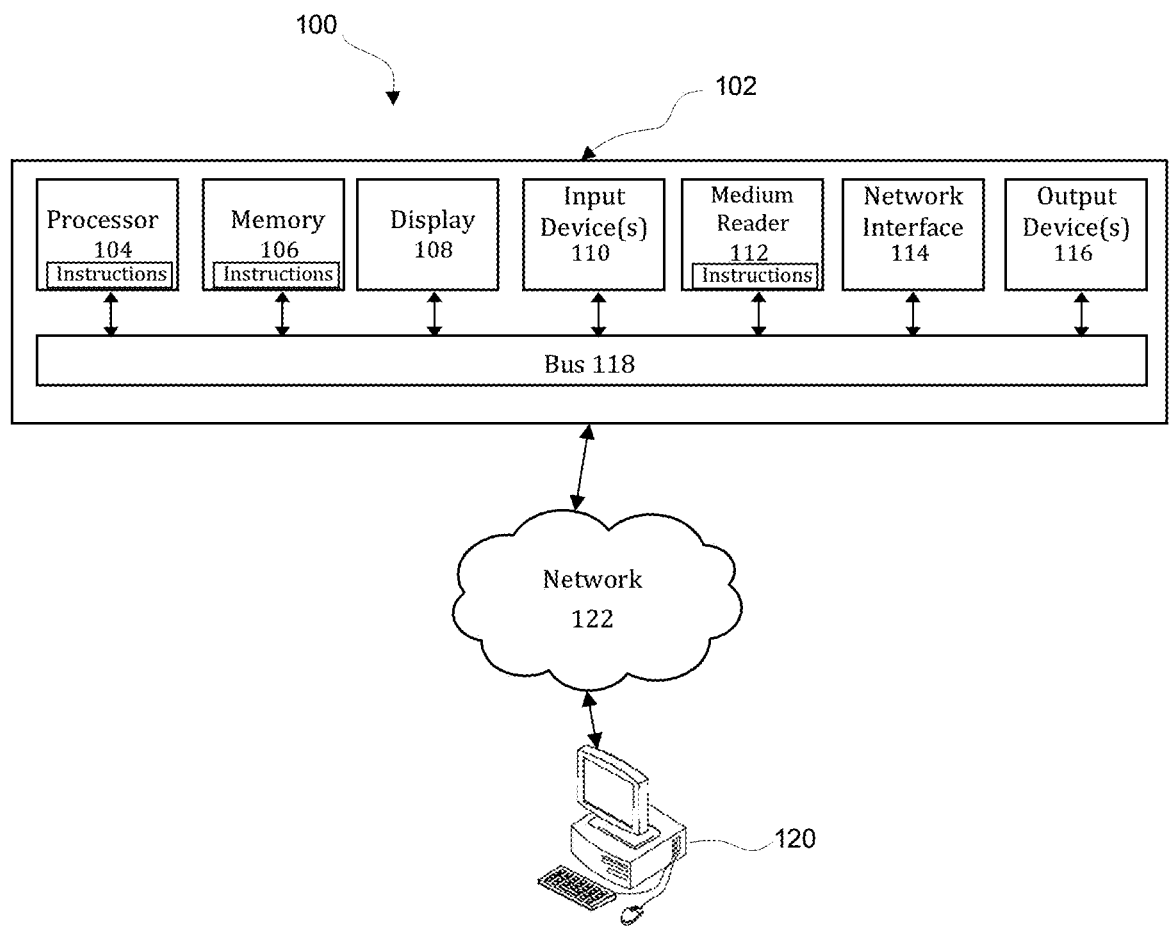
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing a secure aggregation protocol that facilitates federated learning of machine learning models while protecting privacy of individual data sets associated with participants.

Figure 2:
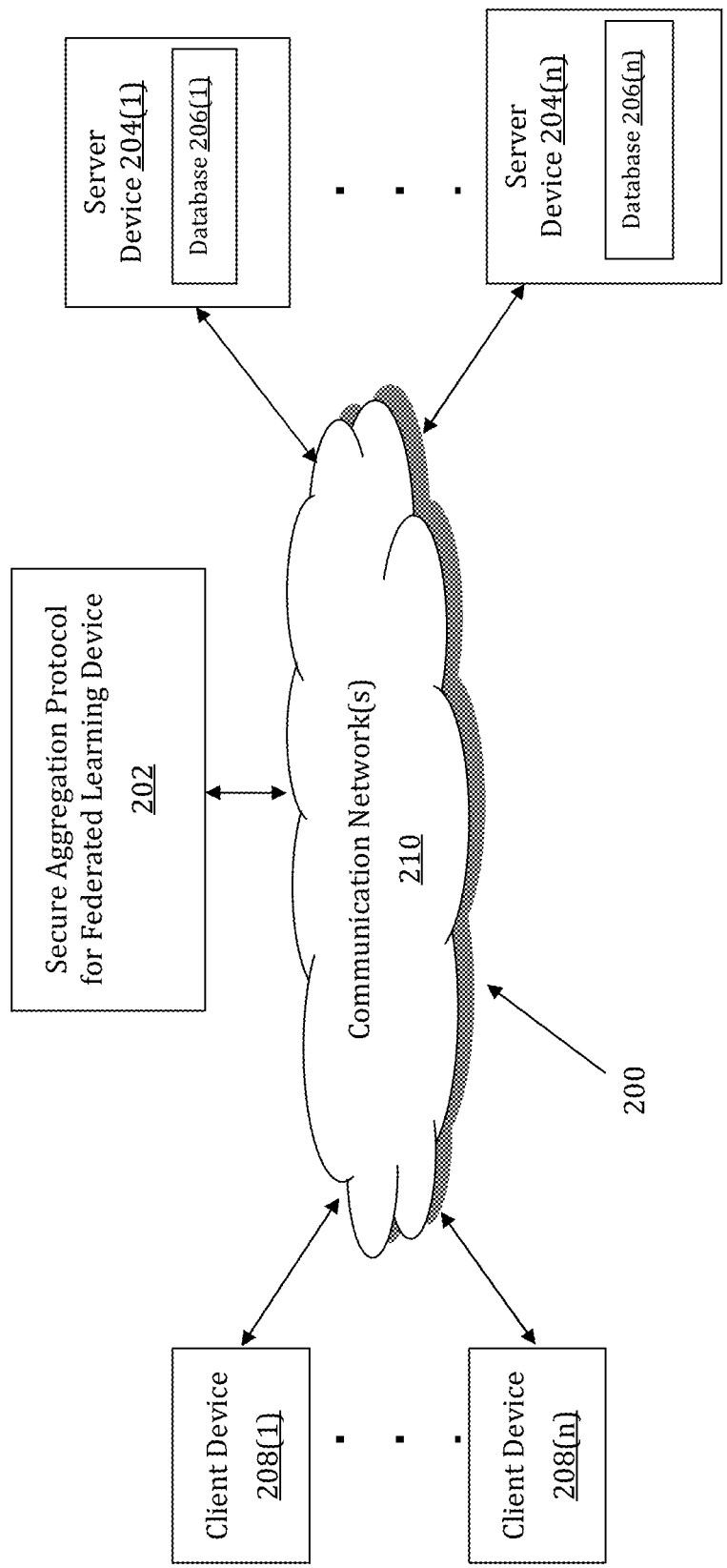
FIG. 2 illustrates an exemplary diagram of a network environment.

Referring to FIG. 2, a schematic of an exemplary network environment 200 for implementing a method for providing a secure aggregation protocol that facilitates federated learning of machine learning models while protecting privacy of individual data sets associated with participants is illustrated. In an exemplary embodiment, the method is executable on any networked computer platform, such as, for example, a personal computer (PC).

The method for providing a secure aggregation protocol that facilitates federated learning of machine learning models while protecting privacy of individual data sets associated with participants may be implemented by a Secure Aggregation Protocol for Federated Learning (SAPFL) device 202. The SAPFL device 202 may be the same or similar to the computer system 102 as described with respect to FIG. 1. The SAPFL device 202 may store one or more applications that can include executable instructions that, when executed by the SAPFL device 202, cause the SAPFL device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SAPFL device 202 itself, may be located in virtual server(s) running in a cloud-based computing environment rather than being tied to one or more specific physical network computing devices. Also, the application(s) may be running in one or more virtual machines (VMs) executing on the SAPFL device 202. Additionally, in one or more embodiments of this technology, virtual machine(s) running on the SAPFL device 202 may be managed or supervised by a hypervisor.

In the network environment 200 of FIG. 2, the SAPFL device 202 is coupled to a plurality of server devices 204(1)-204(n) that hosts a plurality of databases 206(1)-206(n), and also to a plurality of client devices 208(1)-208(n) via communication network(s) 210. A communication interface of the SAPFL device 202, such as the network interface 114 of the computer system 102 of FIG. 1, operatively couples and communicates between the SAPFL device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SAPFL device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and SAPFL devices that efficiently implement a method for providing a secure aggregation protocol that facilitates federated learning of machine learning models while protecting privacy of individual data sets associated with participants.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SAPFL device 202 may be a standalone device or integrated with one or more other devices or apparatuses, such as one or more of the server devices 204(1)-204(n), for example. In one particular example, the SAPFL device 202 may include or be hosted by one of the server devices 204(1)-204(n), and other arrangements are also possible. Moreover, one or more of the devices of the SAPFL device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SAPFL device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store public exchange data and parameters that are usable for implementing a method and a system for providing a secure aggregation protocol that facilitates federated learning of machine learning models while protecting privacy of individual data sets associated with participants.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the SAPFL device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the SAPFL device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the SAPFL device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SAPFL device 202, the server devices 204(1)-204(n), or the client devices 208(1)-208(n), for example, may be configured to operate as virtual instances on the same physical machine. In other words, one or more of the SAPFL device 202, the server devices 204(1)-204(n), or the client devices 208(1)-208(n) may operate on the same physical device rather than as separate devices communicating through communication network(s) 210. Additionally, there may be more or fewer SAPFL devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
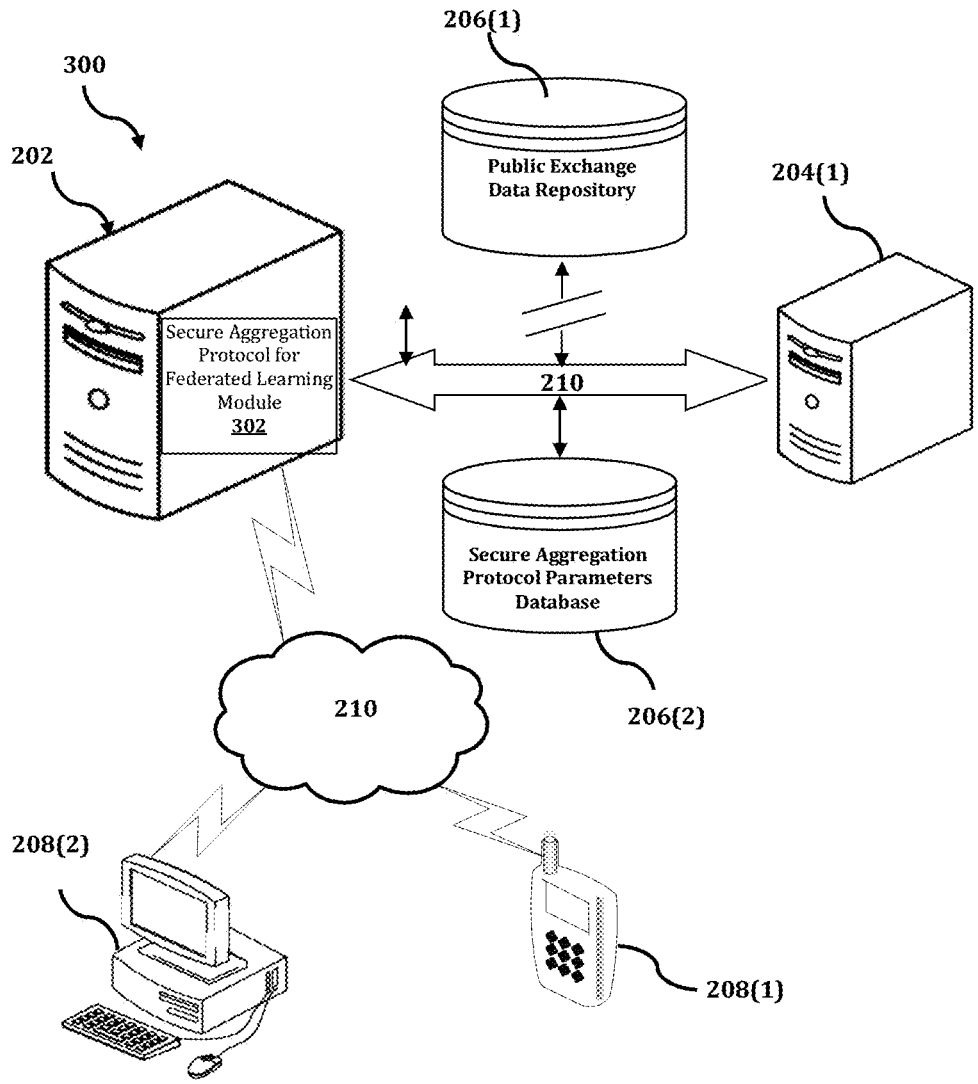
FIG. 3 shows an exemplary system for implementing a method for providing a secure aggregation protocol that facilitates federated learning of machine learning models while protecting privacy of individual data sets associated with participants.

The SAPFL device 202 is described and illustrated in FIG. 3 as including a secure aggregation protocol for federated learning module 302, although it may include other rules, policies, modules, databases, or applications, for example. As will be described below, the secure aggregation protocol for federated learning module 302 is configured to implement a method for providing a secure aggregation protocol that facilitates federated learning of machine learning models while protecting privacy of individual data sets associated with participants.

An exemplary process 300 for implementing a system for providing a secure aggregation protocol that facilitates federated learning of machine learning models while protecting privacy of individual data sets associated with participants by utilizing the network environment of FIG. 2 is illustrated as being executed in FIG. 3. Specifically, a first client device 208(1) and a second client device 208(2) are illustrated as being in communication with SAPFL device 202. In this regard, the first client device 208(1) and the second client device 208(2) may be "clients" of the SAPFL device 202 and are described herein as such. Nevertheless, it is to be known and understood that the first client device 208(1) and/or the second client device 208(2) need not necessarily be "clients" of the SAPFL device 202, or any entity described in association therewith herein. Any additional or alternative relationship may exist between either or both of the first client device 208(1) and the second client device 208(2) and the SAPFL device 202, or no relationship may exist.

Further, SAPFL device 202 is illustrated as being able to access a public exchange data repository 206(1) and a secure aggregation protocol parameters database 206(2). The secure aggregation protocol for federated learning module 302 may be configured to access these databases for implementing a method for providing a secure aggregation protocol that facilitates federated learning of machine learning models while protecting privacy of individual data sets associated with participants.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the SAPFL device 202 via broadband or cellular communication. Of course, these embodiments are merely exemplary and are not limiting or exhaustive.

Upon being started, the secure aggregation protocol for federated learning module 302 executes a process for providing a secure aggregation protocol that facilitates federated learning of machine learning models while protecting privacy of individual data sets associated with participants. An exemplary process for providing a secure aggregation protocol that facilitates federated learning of machine learning models while protecting privacy of individual data sets associated with participants is generally indicated at flowchart 400 in FIG. 4. In an exemplary embodiment, the secure aggregation protocol includes a setup phase, which includes steps S402, S404, S406, and S408; and an aggregation phase, which includes steps S410, S412, S414, and S416.

Figure 4:
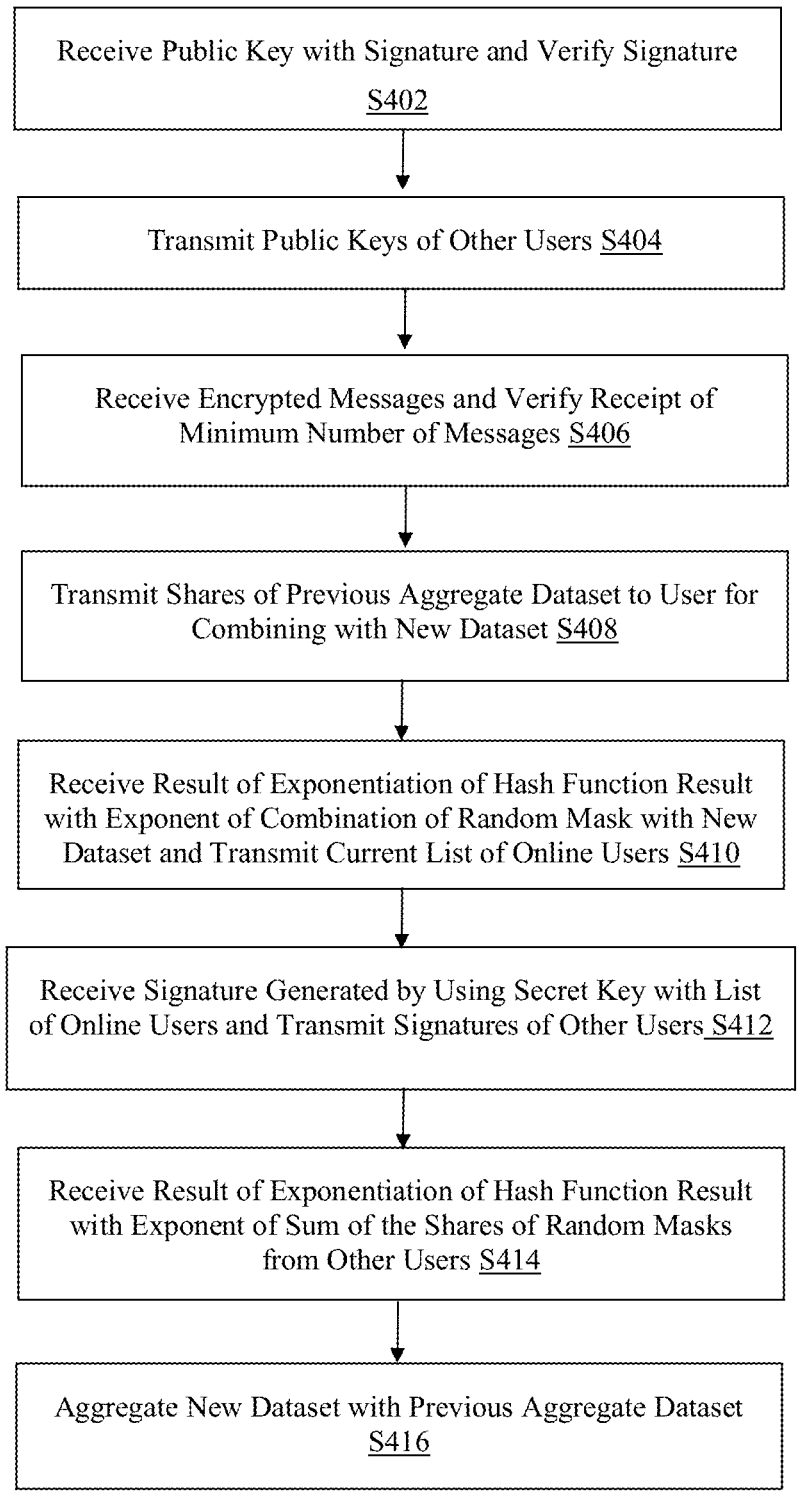
FIG. 4 is a flowchart of an exemplary process for providing a secure aggregation protocol that facilitates federated learning of machine learning models while protecting privacy of individual data sets associated with participants.

In process 400 of FIG. 4, at step S402, the secure aggregation protocol for federated learning module 302 receives, from a first user of a plurality of users, a first public key together with a first signature that is generated by the first user by using a secret key that is associated with the first user. The transmission of the first public key and the first signature by the first user indicates an intention by the first user to provide a dataset that is to be securely aggregated with datasets provided by other users for the purpose of facilitating federated learning of a machine learning model. In an exemplary embodiment, the secure aggregation protocol for federated learning module 302 uses a predetermined public key infrastructure for a purpose of binding each public key with a corresponding user. In an exemplary embodiment, the secure aggregation protocol for federated learning module 302 also uses a predetermined symmetric authentication scheme in order to guarantee that messages between pairs of users cannot be extracted by a malicious adversary and cannot be tampered with without detection thereof.

Upon receipt, the secure aggregation protocol for federated learning module 302 verifies the first signature. Then, at step S404, the secure aggregation protocol for federated learning module 302 transmits, to the first user for which the first signature has been verified, a set of public keys that are associated with other users included in the plurality of users.

At step S406, the secure aggregation protocol for federated learning module 302 receives a set of encrypted messages from the first user. In an exemplary embodiment, the secure aggregation protocol for federated learning module 302 uses a Diffie-Hellman key exchange scheme to facilitate a secure agreement with respect to a symmetric secret to be shared between a pair of users.

In an exemplary embodiment, the secure aggregation protocol for federated learning module 302 also uses a Shamir's secret sharing scheme for dividing a secret into a predetermined number of shares, such that the reconstruction of the secret requires knowledge of a predetermined minimum number of the shares; and the set of encrypted messages includes shares of the new dataset which is intended for aggregation with the previously aggregated dataset, the shares having been generated by using the Shamir's secret sharing scheme. In a scenario where there are one or more malicious adversaries included in the plurality of users, the use of the Shamir's secret sharing scheme has the effect of providing a guarantee that the content of the new dataset is not knowable unless the number of malicious adversaries exceeds one-third of the total number of users.

After receiving the set of encrypted messages from the first user, the secure aggregation protocol for federated learning module 302 verifies that the predetermined minimum number of shares required for reconstruction of the secret has been met. In an exemplary embodiment, the predetermined minimum number of shares may be equal to at least one more than two-thirds of a total number of users.

At step S408, the secure aggregation protocol for federated learning module 302 transmits shares of the previous aggregate dataset to the first user for combining with the new dataset. The first user combines the new dataset with a random mask selected by the first user, and then, at step S410, applies a predetermined hash function to a first iteration number and uses a result thereof as a base of exponentiation for which a corresponding exponent is a the newly formed combination and transmits a result thereof to the secure aggregation protocol for federated learning module 302. In an exemplary embodiment, the predetermined hash function includes a random oracle that is designed to answer each respective unique query submitted thereto with a uniformly random response in its output domain.

Having received the result from step S410, the secure aggregation protocol for federated learning module 302 then sends a current list of online users to the first user. The first user receives the current list of online users and then uses its secret key to generate a second signature with respect to the current list of online users, and then transmits this second signature to the secure aggregation protocol for federated learning module 302. Then, at step S412, the secure aggregation protocol for federated learning module 302 receives the second signature and, in response thereto, transmits corresponding signatures of the other users included in the plurality of users to the first user.

Upon receiving the signatures of the other users, the first user verifies those signatures and then applies the hash function to the first iteration number and uses a result thereof as a base of exponentiation for which a corresponding exponent is a sum of shares of random masks received from the other users and transmits a result thereof to the secure aggregation protocol for federated learning module 302. At step S414, the secure aggregation protocol for federated learning module 302 receives this result, and then, at step S416, the secure aggregation protocol for federated learning module 302 aggregates the new dataset with the previous aggregate dataset.

In an exemplary embodiment, the setup phase is generally performed once, but the aggregation phase may be performed repeatedly, i.e., any number of times, whenever a user indicates an intention to provide an additional dataset to be aggregated into the then-current aggregate dataset. In this aspect, the secure aggregation protocol may repeat each of steps S410, S412, S414, and S416 with respect to other users included in the plurality of users on an as-needed basis.

In an exemplary embodiment, a secure aggregation protocol may be described by using certain notations and cryptographic primitives, which are introduced below.

The notation $[n_1, n_2]$ is used for two integers $n_1$, $n_2$ to denote the set of integers $\{n_1, \ldots, n_2\}$, and the left bound is omitted if it equals to one (i.e., 1), i.e., $[n]$ denotes the set $\{1, \ldots, n\}$. Let p, q be two primes such that $p=2q+1$.

Parameters: 1) n: the total number of users; 2) K: the total number of iterations the protocol will run; 3) X: the domain of the secret input of each user in each iteration; 4) R: the size of the input domain, i.e., $|X|=R$; 5) B: the number of groups in the group version of the protocol.

Cryptographic Primitives: A function $f: N \rightarrow R$ is a negligible function if for every positive integer c there exists an integer $n_c$ such that for all $n > n_c$, $$f(n) < \frac{1}{n^c}.$$

It is said that an event happens with negligible probability if its probability is a function negligible in the security parameter. Symmetrically, it is said that an event happens with overwhelming probability if it happens with 1 but negligible probability. It is said that two ensembles of probability distributions $\{X_n\}_{n \in N}$ and $\{Y_n\}_{n \in N}$ are computationally indistinguishable (denoted with $\approx c$) if for all non-uniform PPT distinguisher D, there exists a negligible function $f$ such that for all $n \in N$, $$|Pr_{t \leftarrow X_n}[D(1^n, t) = 1] - Pr_{t \leftarrow Y_n}[D(1^n, t) = 1]| < f(n).$$

Shamir's Secret Sharing: Shamir's t-out-of-n secret sharing is used to tolerate offline users. Informally speaking, it allows the secret holder to divide the secret into n shares such that anyone who knows t of them can reconstruct the secret, while anyone who knows less than t shares cannot learn anything about the secret. Let s, $x_1, \ldots, x_n \in Z_q$ for some prime q. The Shamir's Secret Sharing scheme consists of two algorithms: 1) SS.share (s, $\{x_1, x_2, \ldots, x_n\}$, t)$\rightarrow\{(s_1, x_1), \ldots, (s_n, x_n)\}$, in which s denotes the secret, $x_1, \ldots,$ $x_n$ denotes the n indices, and t denotes the threshold of the secret sharing. This function returns a list of shares $s_i$ of the secret s with their corresponding indices $x_i$. 2) SS.recon ($\{(s_1, x_1), \ldots, (s_n, x_n)\}$, t)=s, in which each pair ($s_i$, $x_i$) denotes the share $s_i$ on index $x_i$. This function returns the original secret s.

The first function can be implemented by uniformly randomly choosing t−1 coefficients $\alpha_1, \ldots, a_{t-1}$ from $Z_q$, and the first function calculates $s_i = f(x_i)$ for $f(x) = s + a_1 x + \ldots + a_{t-1} x^{t-1}$. The function $f$ can be reconstructed from the shares with the Lagrange basis polynomials. More specifically, let $$\ell i(x) = \prod_{j=i, j \in [n]} \frac{x - x_j}{x_i - x_j},$$

then $f(x) = \Sigma_{i \in [n]} s_i \cdot \ell_i(x)$.

Additionally, the following function is defined as an extension of Shamir's secret sharing. Let p, q be primes such that p=2q+1. Let g E Z; be a generator of $Z_p^*$, and let s, $s_{i,j}$, $a_i \in Z_q$ for i∈[t] and $i_j \in$[q] for j∈[n], then the following expression is a logical result:

.SS.exponentRecon($g^{s_1}, x_1$), ..., ($g^{s_n}$, $x_n$),t)=$\{g^s$, $g^{a_1}, \ldots, g^{a_{t-1}}\}$: With the shares$g^{s_1}, \ldots, g^{s_n}$, it returns the secret and the polynomial coefficients of the Shamir secret sharing in the exponent. More precisely, it returns $\{g^s, g^{a_1}, \ldots, g^{a_{t-1}}\}$ such that for $$f(x) = s + a_1 x + \ldots + a_{t-1} x_{t-1},$$

$$f(x_i) = s_i$$

for $$i \in [n].$$

This function can be implemented without knowing $s_1, \ldots, s_n$ by performing all the linear operations in the exponent.

Shamir's Secret Sharing on integer interval: The above implementation requires the secret and shares to be elements in a finite field. Now a modified version of SS.share and SS.recon is provided, which can secret share and reconstruct secrets in a bounded interval of integers in accordance with a predetermined algorithm. The algorithm is similar to the implementation of Shamir secret sharing over a field, with the key difference that as there is no modulo operation, the shares should not leak the remainder of the secret when divided by $x_i$ and the division reconstruction steps need to happen in the integer set. Thus, the secret s is scaled by $\Delta = Q_{i \in [n]} x_i$ times before secret sharing to guarantee that every share modulo $x_i$ for any i equals 0, and scales the coefficients in the Lagrange basis polynomials to integers by scaling them by $\Delta$ times. The reconstructed secret is therefore $s \cdot \Delta^2$. For simplicity of exposition, the algorithm names SS.share, SS.recon, SS.expoShare, SS.expoRecon are overloaded when which version of the algorithm is needed can be clearly inferred from the context.

Decisional Diffie-Hellman (DDH) Assumption: In an exemplary embodiment, in the secure aggregation protocol, it is assumed that the following assumption holds: Decisional Diffie-Hellman (DDH) Assumption: Let p, q be two primes, p=2q+1. Let g be a generator of $Z_p^*$. Then the following two distributions are computationally indistinguishable, given that a, b, c are independently and uniformly randomly chosen from $Z_q$: ($g^a$, $g^b$, $g^{ab}$) and ($g^a$, $g^b$, $g^c$).

Diffie-Hellman Key Exchange: The Diffie-Hellman key exchange algorithm allows two parties to securely agree on a symmetric secret over a public channel, assuming the discrete log problem is computationally hard. It consists of three algorithms: 1) KA.setup (K)→(G', g, q, H), in which G' is a group of order q with a generator g, H is a hash function. 2) KA.gen (G', g, q, H)→(x, $g^x$) in which x is uniformly sampled from $Z_q$. This algorithm generates a pair of keys used later in key exchange. The secret key x should be kept secret, while the public key $g^x$ will be disclosed to other parties for key exchange. 3) KA.agree($x_u$, $g^{x_v}$)→ $s_{u,v}$=H(($g^{x_v}$)$^{x_u}$). This algorithm allows party u to obtain the symmetric secret $s_{u,v}$=$s_{v,u}$ between party u and party v with its own secret key $x_u$ and the public key $g^{x_v}$ of party v.

Random Oracle: In an exemplary embodiment, it is assumed that there is an existence of a random oracle which answers each unique query with a uniformly random response in its output domain. The random oracle is used to guarantee that all users and the server can access the same fresh randomness for each iteration.

Pseudorandom Generator: A pseudorandom generator (PRG) is an algorithm which extends a short uniformly random seed to a longer sequence of bits which is computationally indistinguishable from a truly random sequence of the same length as long as the random seed is hidden from the distinguisher. In an exemplary embodiment, advantageous use is made of the algorithm PRG(r)→s which takes a uniformly random seed r∈ $\{0,1\}_\lambda$ and generates a sequence s∈ $\{0,1\}^K$. Here, K is the total number of iterations the protocol will run.

Authenticated Encryption: In an exemplary embodiment, symmetric authenticated encryption is used to guarantee that the messages between honest parties cannot be either extracted by a malicious adversary or be tampered without being detected. In an exemplary embodiment, an authenticated encryption scheme consists of two algorithms: 1) AE.enc(m,k)→c, which encrypts message m with a key k and generates a ciphertext c; and 2) AE.dec(c,k)→m, which decrypts the ciphertext c with the key k and outputs the original message m. In an exemplary embodiment, it is assumed that the scheme satisfies IND-CCA2 security.

Public Key Infrastructure: A public key infrastructure (PKI) is an arrangement that binds public keys with the respective identities of participants and provides sender authentication for messages. In an exemplary embodiment, the existence of PKI is assumed in order to guarantee that the server cannot simulate arbitrary number of users.

DDH Group with an Easy Discrete Logarithm (DL) Subgroup: In an exemplary embodiment, to accommodate larger input, advantageous use is made of the following assumption: Intuitively, it assumes the existence of a group G=⟨g⟩ with a subgroup F=⟨$f$⟩ such that the DDH assumption holds in G and discrete logarithm is easy to calculate in the group F.

More formally, the following definition may be used A DDH group with an easy DL subgroup is a pair of algorithms (cl.gen, cl.solve). The cl.gen algorithm is a group generator which takes as input two parameters λ and μ and outputs a tuple (B, N, p, s, g, $f$, G, F). The integers B, N, p and s are such that s is a λ-bit integer, p is a μ-bit integer, gcd(p,s)=1, N=p·s, and B is an upper bound for s. The set (G,•) is a cyclic group of order n generated by g, and F & G is the subgroup of G of order p and f is a generator of F. The upper bound B is chosen such that the distribution induced by $\{g^r$, r \$←−$\{0, \ldots, Bp-1\}\}$ is statistically distinguishable from the uniform distribution on G. It is assumed that the canonical surjection π: G→G/F is efficiently computable from the description of G, F and p and that given an element h∈G/F one can efficiently lift h in G, i.e., compute an element $h_f \in \pi^{-1}(h)$.

It is further assumed that: the DL problem is easy in F. The cl.solve algorithm is a deterministic polynomial time algorithm that solves the discrete logarithm problem in F:

$$Pr[x = x^* : (B, N, p, s, g, f, G, F)\$ \leftarrow -cl.gen(1^\lambda, 1^\mu),$$
$$x \leftarrow -Z/pZ, X = f^x,$$
$$x^* \leftarrow cl.solve(B, p, g, f, G, F, X)] = 1$$

Still further, it is assumed that the DDH problem is hard in G even with access to the cl.solve algorithm:

$$|Pr[b = b^* : (B, N, p, s, g, f, G, F)\$ \leftarrow -cl.gen(1^\lambda, 1^\mu),$$
$$x, y, z \leftarrow -Z/N\,Z, X = g^x, Y = g^y,$$
$$b \leftarrow -\{0, 1\}, Z_0 = g^z, Z_1 = g^{xy},$$
$$b*\$ \leftarrow -A(B, p, g, f, G, F, X, Y, Z_b, cl.solve(\cdot))] - 1/2| \leq negl(\lambda)$$

for any probabilistic polynomial time adversary A.

Figure 5:
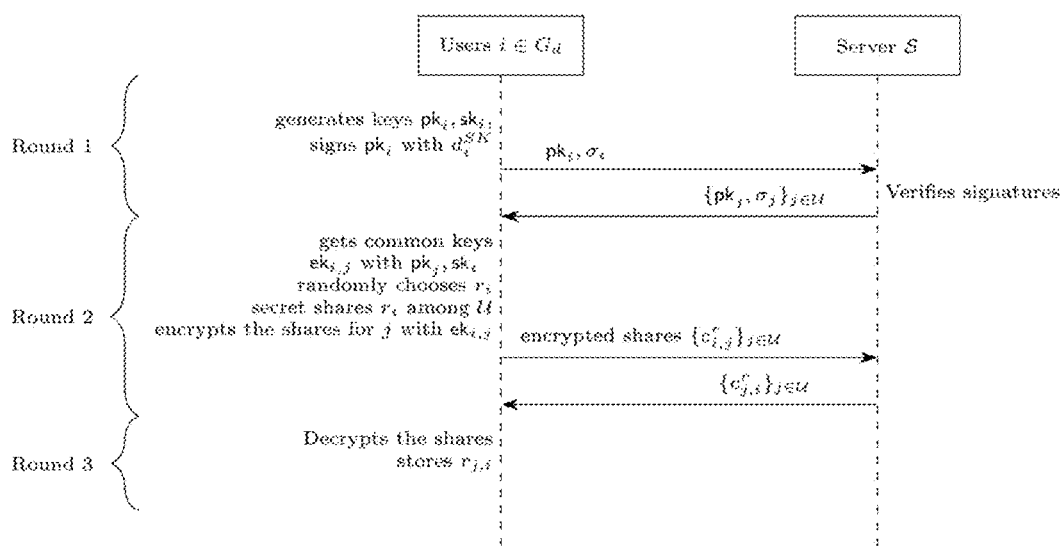
FIG. 5 is a data flow diagram that illustrates a setup phase of a secure aggregation protocol that facilitates federated learning of machine learning models while protecting privacy of individual data sets associated with participants, according to an exemplary embodiment.

FIG. 5 is a data flow diagram 500 that illustrates a setup phase of a secure aggregation protocol that facilitates federated learning of machine learning models while protecting privacy of individual data sets associated with participants, according to an exemplary embodiment. FIG. 6 is an algorithm 600 that corresponds to the setup phase of the secure aggregation protocol that facilitates federated learning of machine learning models while protecting privacy of individual data sets associated with participants, according to an exemplary embodiment.

Figure 7:
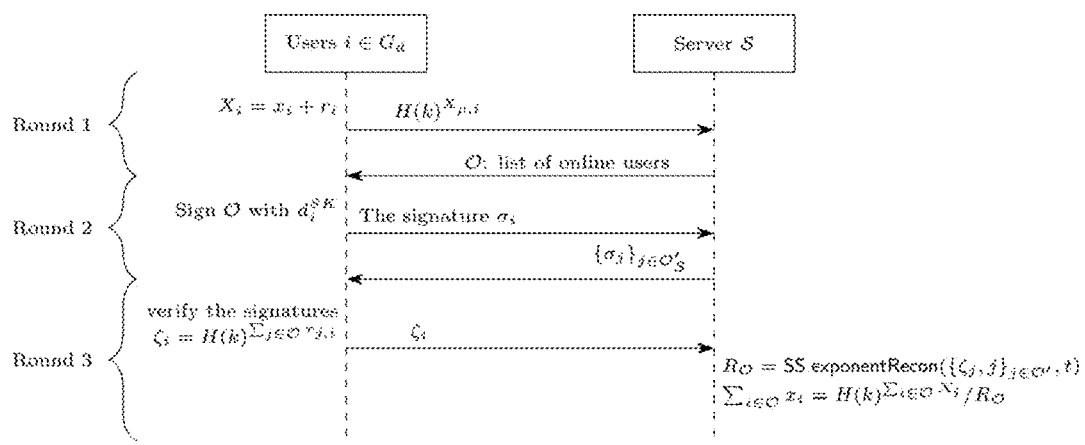
FIG. 7 is a data flow diagram that illustrates an aggregation phase of a secure aggregation protocol that facilitates federated learning of machine learning models while protecting privacy of individual data sets associated with participants, according to an exemplary embodiment.

FIG. 7 is a data flow diagram 700 that illustrates an aggregation phase of a secure aggregation protocol that facilitates federated learning of machine learning models while protecting privacy of individual data sets associated with participants, according to an exemplary embodiment. FIG. 8 is an algorithm 800 that corresponds to the aggregation phase of the secure aggregation protocol that facilitates federated learning of machine learning models while protecting privacy of individual data sets associated with participants, according to an exemplary embodiment. FIG. 9A and FIG. 9B are an algorithm 900 that corresponds to the setup phase of the secure aggregation protocol that facilitates federated learning of machine learning models while protecting privacy of individual data sets associated with participants, according to an exemplary embodiment. FIG. 10 is an algorithm 1000 that corresponds to the aggregation phase of the secure aggregation protocol that facilitates federated learning of machine learning models while protecting privacy of individual data sets associated with participants, according to an exemplary embodiment.

In an exemplary embodiment, the secure aggregation protocol runs with one server and n users 1, 2, . . . , n, which can only communicate with the server through secure channels. The protocol consists of two phases: the Setup phase and the Aggregation phase. The Setup phase runs only once at the beginning of the protocol, and the Aggregation phase runs for K iterations after the Setup phase completes. It is assumed that each user holds a secret input at the beginning of each iteration of the Aggregation phase. Users can drop offline at any time point during the execution. If a user drops offline in some round in some iteration, it is assumed that the partial message it might have already sent in the current round is ignored, and it stays offline until the end of the current iteration. The offline users the can come back online at beginning of some later iterations. In the honest-but-curious setting, at the end of each iteration, the server is able to reconstruct the sum of the secrets of at least t users as long as there are t users online from the beginning to the end of that iteration if t≥⌊2n/3⌋+1. In the presence of a malicious adversary, the protocol guarantees privacy for honest users when the server is corrupt as long as the adversary controls less than n/3 users.

Referring to FIG. 5, a high level construction of the Setup phase is illustrated, and details thereof are provided in FIG. 6 and in FIGS. 9A and 9B. Referring to FIG. 7, a high level construction of the Aggregation phase is illustrated, and details therefore are provided in FIG. 8 and in FIG. 10.

Accordingly, with this technology, an optimized process for providing a secure aggregation protocol that facilitates federated learning of machine learning models while protecting privacy of individual data sets associated with participants is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for aggregating data, the method being implemented by at least one processor, the method comprising:
   receiving, by the at least one processor from a first user from among a plurality of users, a first public key and a first signature that is generated by the first user by using a first secret key that is associated with the first user;
   verifying, by the at least one processor, the first signature;
   transmitting, by the at least one processor to the first user, a set of public keys that are associated with other users included in the plurality of users;
   receiving, by the at least one processor from the first user, a first set of encrypted messages;
   verifying, by the at least one processor, that at least a predetermined minimum number of encrypted messages have been received from the plurality of users;
   transmitting, by the at least one processor to the first user, at least one set of encrypted messages received from the other users included in the plurality of users;
   receiving, by the at least one processor from the first user, a result of applying a predetermined hash function to a first iteration number and using a result thereof as a base of exponentiation for which a corresponding exponent is a combination of a first new dataset with a first random mask selected by the first user;
   transmitting, by the at least one processor to the first user, a first current list of online users;
   receiving, by the at least one processor from the first user, a second signature that is generated by using the first secret key with respect to the first current list of online users;
   transmitting, by the at least one processor to the first user, a first set of signatures that are received from the other users included in the plurality of users;
   receiving, by the at least one processor from the first user, a result of applying the predetermined hash function to the first iteration number; and
   aggregating, by the at least one processor, the first new dataset with the first aggregated dataset in order to generate a second aggregated dataset.

2. The method of claim 1, further comprising:
   when a result of applying the predetermined hash function to a combination of the second aggregated dataset with a second new dataset is received from a second user from among the plurality of users, transmitting, to the second user, a second current list of online users;
   receiving, from the second user, a third signature that is generated by the second user using a second secret key that is associated with the second user with respect to the second current list of online users;
   transmitting, to the second user, a second set of signatures that are received from the other users included in the plurality of users;
   receiving, from the second user, a result of applying the predetermined hash function to the first iteration number and using a result thereof as a base of exponentiation for which a corresponding exponent is a sum of shares of random masks received from the other users; and aggregating the second new dataset with the second aggregated dataset in order to generate a third aggregated dataset.

3. The method of claim 1, wherein the predetermined minimum number of encrypted messages is equal to at least one more than two-thirds of a total number of users included in the plurality of users.

4. The method of claim 1, further comprising guaranteeing that a content of the first new dataset is not knowable to the other users when a maximum number of malicious adversaries included in the plurality of users is less than one-third of a total number of users included in the plurality of users.

5. The method of claim 1, further comprising using a predetermined public key infrastructure to bind each respective one of the set of public keys with a corresponding one of the plurality of users.

6. The method of claim 1, further comprising using a Diffie-Hellman key exchange algorithm to facilitate a secure agreement with respect to a symmetric secret to be shared between a pair of users from among the plurality of users.

7. The method of claim 1, further comprising using a predetermined symmetric authentication scheme to guarantee that messages between a pair of users from among the plurality of users cannot be extracted by a malicious adversary and cannot be tampered with in an undetectable manner.

8. The method of claim 1, further comprising using a Shamir's secret sharing scheme to divide a secret into a predetermined number of shares such that a reconstruction of the secret requires knowledge of a predetermined minimum number of the shares.

9. The method of claim 1, wherein the predetermined hash function comprises a random oracle that is designed to answer each respective unique query with a uniformly random response in a predetermined output domain.

10. A computing apparatus for aggregating data, the computing apparatus comprising:
a processor;
a memory; and
a communication interface coupled to each of the processor and the memory,
wherein the processor is configured to:
receive, via the communication interface from a first user from among a plurality of users, a first public key and a first signature that is generated by the first user by using a first secret key that is associated with the first user;
verify the first signature;
transmit, via the communication interface to the first user, a set of public keys that are associated with other users included in the plurality of users;
receive, via the communication interface from the first user, a first set of encrypted messages;
verify that at least a predetermined minimum number of encrypted messages have been received from the plurality of users;
transmit, via the communication interface to the first user, at least one set of encrypted messages received from the other users included in the plurality of users;
receive, via the communication interface from the first user, a result of applying a predetermined hash function to a first iteration number and using a result thereof as a base of exponentiation for which a corresponding exponent is a combination of a first new dataset with a first random mask selected by the first user;
transmit, via the communication interface to the first user, a first current list of online users;
receive, via the communication interface from the first user, a second signature that is generated by using the first secret key with respect to the first current list of online users;
transmit, via the communication interface to the first user, a first set of signatures that are received from the other users included in the plurality of users;
receive, via the communication interface from the first user, a result of applying the predetermined hash function to the first iteration number; and
aggregate the first new dataset with the first aggregated dataset in order to generate a second aggregated dataset.

11. The computing apparatus of claim 10, wherein the processor is further configured to:
when a result of applying the predetermined hash function to a combination of the second aggregated dataset with a second new dataset is received from a second user from among the plurality of users, transmit, to the second user, a second current list of online users;
receive, from the second user, a third signature that is generated by the second user using a second secret key that is associated with the second user with respect to the second current list of online users;
transmit, to the second user, a second set of signatures that are received from the other users included in the plurality of users;
receive, from the second user, a result of applying the predetermined hash function to the first iteration number and using a result thereof as a base of exponentiation for which a corresponding exponent is a sum of shares of random masks received from the other users; and
aggregate the second new dataset with the second aggregated dataset in order to generate a third aggregated dataset.

12. The computing apparatus of claim 10, wherein the predetermined minimum number of encrypted messages is equal to at least one more than two-thirds of a total number of users included in the plurality of users.

13. The computing apparatus of claim 10, wherein the processor is further configured to guarantee that a content of the first new dataset is not knowable to the other users when a maximum number of malicious adversaries included in the plurality of users is less than one-third of a total number of users included in the plurality of users.

14. The computing apparatus of claim 10, wherein the processor is further configured to use a predetermined public key infrastructure to bind each respective one of the set of public keys with a corresponding one of the plurality of users.

15. The computing apparatus of claim 10, wherein the processor is further configured to use a Diffie-Hellman key exchange algorithm to facilitate a secure agreement with respect to a symmetric secret to be shared between a pair of users from among the plurality of users.

16. The computing apparatus of claim 10, wherein the processor is further configured to use a predetermined symmetric authentication scheme to guarantee that messages between a pair of users from among the plurality of users cannot be extracted by a malicious adversary and cannot be tampered with in an undetectable manner.

17. The computing apparatus of claim 10, wherein the processor is further configured to use a Shamir's secret sharing scheme to divide a secret into a predetermined number of shares such that a reconstruction of the secret requires knowledge of a predetermined minimum number of the shares.

18. The computing apparatus of claim 10, wherein the predetermined hash function comprises a random oracle that is designed to answer each respective unique query with a uniformly random response in a predetermined output domain.

19. A non-transitory computer readable storage medium storing instructions for aggregating data, the storage medium comprising executable code which, when executed by a processor, causes the processor to:

receive, from a first user from among a plurality of users, a first public key and a first signature that is generated by the first user by using a first secret key that is associated with the first user;

verify the first signature;

transmit, to the first user, a set of public keys that are associated with other users included in the plurality of users;

receive, from the first user, a first set of encrypted messages;

verify that at least a predetermined minimum number of encrypted messages have been received from the plurality of users;

transmit, to the first user, at least one set of encrypted messages received from the other users included in the plurality of users;

receive, from the first user, a result of applying a predetermined hash function to a first iteration number and using a result thereof as a base of exponentiation for which a corresponding exponent is a combination of a first new dataset with a first random mask selected by the first user;

transmit, to the first user, a first current list of online users;

receive, from the first user, a second signature that is generated by using the first secret key with respect to the first current list of online users;

transmit, to the first user, a first set of signatures that are received from the other users included in the plurality of users;

receive, from the first user, a result of applying the predetermined hash function to the first iteration number; and aggregate the first new dataset with the first aggregated dataset in order to generate a second aggregated dataset.

20. The storage medium of claim 19, wherein when executed by the processor, the executable code further causes the processor to:

when a result of applying the predetermined hash function to a combination of the second aggregated dataset with a second new dataset is received from a second user from among the plurality of users, transmit, to the second user, a second current list of online users;

receive, from the second user, a third signature that is generated by the second user using a second secret key that is associated with the second user with respect to the second current list of online users;

transmit, to the second user, a second set of signatures that are received from the other users included in the plurality of users;

receive, from the second user, a result of applying the predetermined hash function to the first iteration number and using a result thereof as a base of exponentiation for which a corresponding exponent is a sum of shares of random masks received from the other users; and aggregate the second new dataset with the second aggregated dataset in order to generate a third aggregated dataset.

* * * * *